United States Patent
Wurmbrand et al.

[15] 3,669,056
[45] June 13, 1972

[54] ARC PLASMA PROPULSION SYSTEM

[72] Inventors: Mihai Wurmbrand, 1431 South Adams, Glendale, Calif. 91209; John L. Doane, 60 Wadsworth Street, Apt. 17D, Cambridge, Mass. 02142

[22] Filed: Sept. 18, 1969

[21] Appl. No.: 859,036

[52] U.S. Cl. ..................................115/12 R, 60/203, 60/221
[51] Int. Cl. ........................................................B63h 11/00
[58] Field of Search ..................115/11, 12, 14, 16; 60/203, 60/221, 222; 417/48

[56] References Cited

UNITED STATES PATENTS 3,239,130    3/1966    Naundorf..............................417/48 X
3,141,296    7/1964    Jacobs...................................60/203

FOREIGN PATENTS OR APPLICATIONS 25,055    6/1914    Great Britain..........................115/11

*Primary Examiner*—Trygve M. Blix
*Attorney*—Sellers and Brace

[57] ABSTRACT

An arc plasma propulsion system for propelling a buoyant structure through liquid utilizing a directed liquid stream created by a continuing or a pulsing electric arc in a semi-confined body of liquid. The resulting accelerated liquid stream is directed rearwardly through a divergent passage and is effective to propel the structure forwardly as well as in a changing course by pivoting the propulsion device in an appropriate direction.

7 Claims, 6 Drawing Figures

PATENTED JUN 13 1972 3,669,056

INVENTORS.
MIHAI H. WURMBRAND
JOHN L. DOANE

ATTYS

ARC PLASMA PROPULSION SYSTEM

This invention relates to propulsion systems for ships and other buoyant bodies and more particularly to a novel plasma arc confined and utilized in a manner to provide an accelerated directed liquid stream effective to propel a supporting buoyant structure by reactive forces.

Conventional propulsion systems for boats and other buoyant structures have been provided heretofore primarily by rotary propellers projecting rearwardly from the stern of the object. The efficiency is largely dependent on the mass and velocity of water displaced by the propeller and these in turn depend on such factors as the diameter of the propeller, its rotational speed, width of its blades and their angle of incidence. As is well known to those skilled in the design of propellers, numerous compromises must be made. Excessive angular velocity must be avoided else destructive centrifugal forces are generated and highly disruptive cavitation conditions develop accompanied by serious power loss. Additionally, the mass of the propeller and the necessity of using complex gearing to transmit power to a pivoted propeller from a drive shaft militate against use of the propeller in a pivoting mount as a means for controlling the path of movement through the water.

Accordingly, it is a primary object of this invention to provide a novel arc plasma propulsion system.

Another object of the invention is the provision of a unique combined propulsion and steering apparatus for ships and the like buoyant bodies effective to provide an accelerated directed liquid stream and to utilize the same effectively and efficiently in propelling a supporting buoyant structure.

Another object of the invention is the provision of a propulsion system for operation submerged in water or other liquid and effective to utilize the liquid and electric energy passing between spaced electrodes to create a directed stream of liquid to provide either continuous thrust or closely spaced thrusts and to utilize the energy so produced for useful purposes.

Another object of the invention is the provision of a propulsion system for operation submerged in water or other liquid with a combination of electrodes and semi-enclosed housing both shaped in a novel manner to direct the power produced in the discharge between said electrodes so as to provide at the open end of said housing an accelerated stream of liquid moving in essentially only one direction, opposite to the desired direction of propulsion of the structure to which the system is attached.

Another object of this invention is the provision of a propulsion system with a unique housing providing thrust for a supporting buoyant structure not only due to reactive forces generated by liquid accelerated within its interior and directed rearward through its large open end, but also due to the simultaneous decrease in hydro-dynamic pressure along the exterior or surface of said housing and increase in liquid pressure on the interior surface.

These and other more specific objects will appear upon reading the following specification and claims and upon considering in connection therewith the attached drawing to which they relate.

Figure 1:
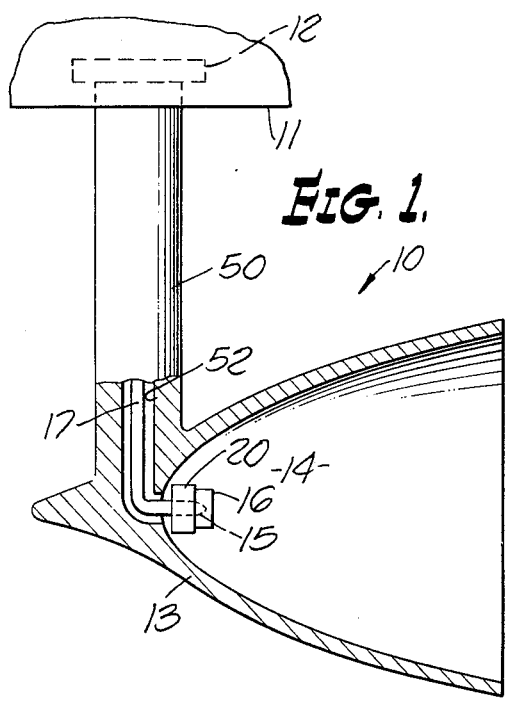
FIG. 1 is a side elevational, partly in section, showing one preferred embodiment of the invention attached to the hull of a ship to propel the same.
Figure 2:
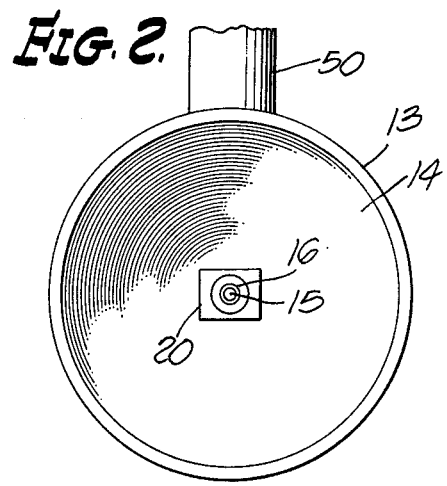
FIG. 2 is a fragmentary end view from the right hand side of FIG. 1.

Referring now to the drawing, there is shown (in FIG. No. 1) an exemplary embodiment of an arc plasma propulsion system, designated generally 10, located beneath the hull of ship 11, it being understood that this hull represents any suitable buoyant object adapted to be propelled through water or other liquid. The hull design may be of a wide variety of types and contours. As herein shown by way of example, propulsion system 10 has a tubular shank 50 pivotally supported by journal 12 rigidly secured in ship hull 11 well below the water line.

Figure 3:
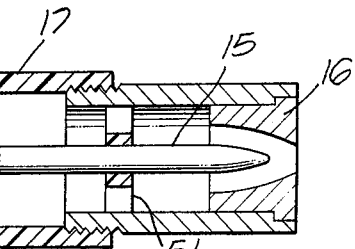
FIG. 3 is cross sectional view on an enlarged scale through electrodes employed to generate the arc plasma.

The propulsion generator proper comprises a strong housing 13 having sufficient strength to withstand the high pressures created in its arc plasma generating cavity 14. The interior of this cavity 14 as well as its housing has the shape of a rearwardly-diverging parabolic surface of revolution. The electrodes 15 and 16 shaped as shown in FIG. 3 and as described below are placed in the focal point of parabolic cavity 14. The arc plasma created between a pair of such electrodes generates pressure on the surrounding liquid, directed outward in almost all directions. The parabolic chamber 14 has the geometrical property that liquid accelerated in any such direction from near the focal point of the parabolic chamber is deflected at the chamber wall in such a manner that all the accelerated liquid which leaves the open end of the chamber is directed approximately along the axis of the parabola chamber, providing maximum reactive thrust in the desired direction. The width of this parabola at its open end should be sufficiently large that the velocity of the accelerated liquid discharging therefrom is small enough relative to the ship's speed to maintain good efficiency and so that the thrust of this accelerated liquid can act over a large-enough area to provide high efficiency propulsion.

The exterior of this housing is also shaped approximately parabolically, the exact shape being such as to provide high efficiency stream-line flow. The liquid in which the housing moves, upon encountering the front of the exterior of the housing is diverted around it, the speed of the liquid near the housing being thereby increased, since this liquid has further to travel to get to the rear of the housing than does the surrounding liquid. Hydrodynamically, the pressure on the outside of the housing is thereby decreased below that which a free-flowing liquid stream would exert on a flat surface placed perpendicular to its direction of flow. At the same time, the liquid entering the interior of the housing, in a manner described below, is accelerated by the arc plasma and creates pressure on the interior surface of the housing as it is deflected from this surface. Because this interior surface has a rearwardly-diverging symmetrical shape, the net force on the housing of all such deflected liquid is in the forward direction. The combined effect of the pressures on the exterior and interior of the housing is similar to that which operates in the lift of an air plane wing, and provides a forward thrust in addition to the reactive thrust provided by the liquid as it is accelerated rearward out the open end of the parabolic housing. In this way the effects of the drag on the housing are minimized.

The arc plasma referred to above is created within chamber 14 by means of a pair of electrodes 15 and 16 as shown in FIG. 3. By this it is understood that one electrode in a tube-like shape surrounds the other to create a nozzle. The electrodes are formed of suitable material, such as stainless steel or tungsten, and at least one electrode, as electrode 15, is suitably mounted moveably supported in insulating in spider 51 (FIG. 3) axially within the nozzle. Electrode 15 terminates at its inner end within a casing concealing any suitable feed mechanism 20 for maintaining the inner ends of the electrodes and the caliber of the nozzle at proper distance and constancy for generating the arc plasma. Since such feed mechanism is well known to persons skilled in the construction and operation of electric arc equipment, it will be unnecessary to illustrate and describe such details herein.

Figure 4:
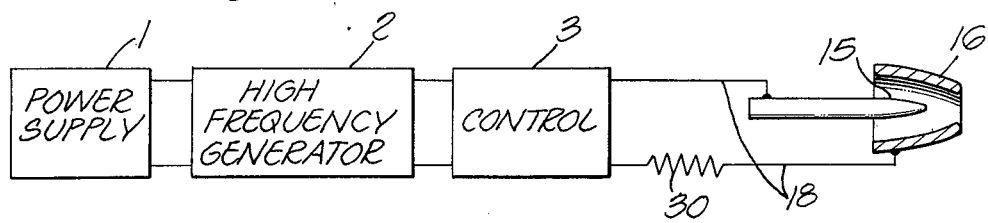
FIG. 4 is a schematic of the power supply for the arc plasma.

Supplying power to feed mechanism 20 and to electrodes 15 and 16 is cabling 18 extending to a power supply 1 and a high frequency generator 2 and a control unit 3 positioned in the ship or other object being propelled and connected as shown in FIG. 4.

The details of the power supply 1, high frequency generator 2, and control unit 3 need not be described in detail since various arrangements may be employed to supply alternating current, direct current or pulsing DC to electrodes 15 and 16. The voltage employed is governed in large measure by the magnitude of the arc plasma required for a particular propulsion requirement and the area and length of the gap between the electrodes. A suitable voltage range at the electrodes is 100 to 100,000 volts with a current flow ranging between 1 and 1,000 amperes. A series of banks of capacitors of suitable capacity may be employed in combination with suitable control switch gear and timing means for periodically discharging the banks in in sequence across the gap between electrodes 15, 16. If pulsing direct or alternating current is applied to the electrodes, the spacing between successive energizing pulses is determined by the frequency of the energizing power supply. Continuous direct current may also be used.

As is made evident from the drawing in FIG. 1, housing 13 is provided with a tubular shank 50 pivotally supported in journal 12 secured to the hull of the ship. Housing 13 could be provided with more than one tubular shank and could still be rotated if the several shanks were mounted on a turntable inside the ship. Tubular shank 50 is hollow to provide space for the insulating tube 17 as well as for a water supply tube 52 to supply liquid to the generating chamber 14. Suitable steering gear is preferably connected to the upper end of journal 12 effective to rotate tubular shank 50 and the attached housing 13 in either direction about the vertical axis through the journal. The steering gear is not shown, but will be understood as being of any suitable and well known character supported within the hull of ship 11.

Suitable frequencies for the energizing power supply would be 60 to 1,000 Hertz, designed so as to resonate with the mechanical natural frequencies which exist in the pulsating pressures of an electric arc, so as to increase the heating of the liquid and hence increase the pressures. If continuous direct current is employed and if alternating current is easier to generate alternating current could be rectified by silicon-controlled rectifiers, mercury-arc rectifiers, or the like, well known in scientific literature.

Through tube 52 water is supplied to chamber 14 under a continuous pressure up to 200 atmospheres. The forward conical end of housing 13 should be manufactured out of suitable heavy metal alloys so as to withstand the high pressures at the front of the housing and to counter-balance the housing.

To operate the described propulsion system, power unit 1 is activated. The high frequency voltage thereupon creates a spark across the gap between electrodes 15 and metallic torch nozzle 16 creating an ionized path through water flowing under pressure through the orifice. A DC arc, limited in current by resistor 30 or other current-controller will follow the ionized path and generate additional ionized gas particles. The arc thus formed will be carried by the flow of water through tube 52 into the cavity 14 which is immersed in and filled with water. Usually the servo mechanism 20 governing the feed of the electrodes toward one another keeping constant the orifice of the nozzle to compensate for wear and loss of material from their inner ends is controlled automatically and in accordance with loss of material therefrom.

Through tube 52 water is introduced to the electrodes 15 and 16 under pressure. When electrical power is applied to electrodes 15 and 16 and after arc is established, hot plasma is generated between the tips of the electrodes with the nozzle. Energy is stored in the plasma in the form of particle kinetic energy, vaporization of the water, dissociation of water molecules into hydrogen and oxygen atoms and molecules, exciting the electrons in these atoms and molecules to high energy levels, and causing separation of the electrons from their parent atoms and molecules (ionization). The mechanical inertia of the surrounding liquid resists this expansion to an extent depending on its density, resulting in the development of high pressures. Most of the power loss from the arc plasma is that used to generate these pressures and associated shock waves. Energy to convert liquid into additional plasma is provided through the recombination of ionized atoms and electrons. The resulting pressures act to accelerate the water in almost all directions. The parabolic surface constituting part of the interior surface of the housing around the electrodes, deflects this water rearwardly coaxially of chamber 14. It is evident that a reactive thrust is thereby produced which is effective to propel a buoyant object, such as a ship, forwardly.

Figure 6:
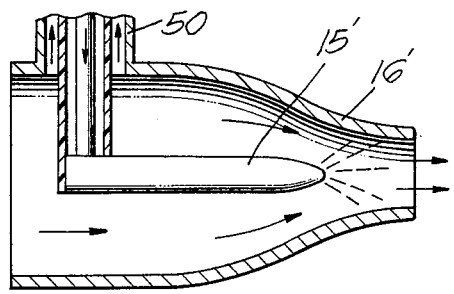
FIG. 6 is a cross sectional view through a second preferred embodiment of the invention wherein the propulsion chamber is open at both ends.

The whole electrode nozzle system described above may also be used without the parabolic casing and outside of such one, such as that shown by way of example in FIG. 6. In this embodiment of the arc plasma system, water would be drawn into the nozzle region directly through the opening in front of the nozzle by the motion of the ship, rather than through a tube coming down from the hull of the ship.

Figure 5:
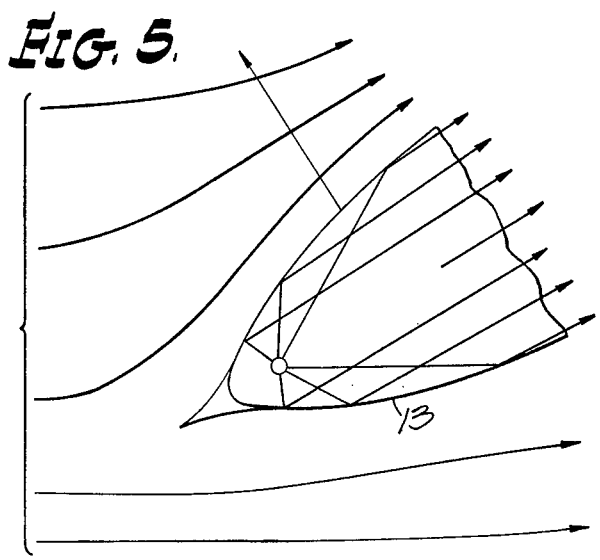
FIG. 5 is a diagrammatic view showing the housing of the propulsion generator rotated about its supporting shank and effective to change the direction of propulsion through the water.

Although only two illustrative arc plasma propulsion units have been shown and described it will be understood that a plurality or a cluster of identical propulsion units may be arranged either in a closely integrated group or spaced very substantially from one another and controlled in a manner to augment one another to provide a large-capacity propulsion power unit. Desirably, the power supply 1, high frequency generator 2, control mechanism 3, and the feed control mechanism 20 or a cluster or a group of propulsion units includes sequencing control mechanism to operate the various units either in timed sequence or in paired time relationship, and in such manner as to provide a well-balanced power thrust spaced to either side of the longitudinal center of the object being propelled. In other words, if the separate propulsion units are arranged crosswise of the stern of a larger vessel, a pair of similarly located units on either side of the ship centerline would be energized simultaneously to assure a uniform forward thrust from points spaced the same distance from either lateral side of the centerline. On the other hand, if it were desired to use multiple propulsion units to guide or steer the ship, the controller could be programmed to utilize a greater number of units on one side than on the other, the difference in the number so employed being selected in accordance with the degree of changes in course desired. Other equivalent modes of programming multiple propulsion units in accordance with the principles of this invention will be apparent from the foregoing including the use of differential amounts of electrical energy supplied to units on either side of the centerline. FIG. 5 shows how the parabolic housing can act as a rudder as it is pivoted by shank 50 so as to deflect the water passing by it.

While the particular arc plasma propulsion system herein shown and disclosed in detail is fully capable of attaining the objects and providing the advantages hereinbefore stated, it is to be understood that it is merely illustrative of the presently preferred embodiments of the invention.

We claim:

1. An arc plasma propulsion system for propelling a load supporting structure through a body of water comprising in combination: a plasma propulsion unit having a housing formed with a rearwardly facing parabolic cavity and including means supporting the same submerged in water from said load supporting structure, a pair of concentrically related electrodes supported in said parabolic cavity with their axes generally horizontal, said housing and electrodes being arranged for bodily pivotal movement about a generally vertical axis normal to the axes of said electrodes and parabolic cavity, the rearward ends of said electrodes normally facing rearwardly and oppositely to the desired direction of propulsion of said load supporting structure, means supporting the rear ends of said electrodes properly spaced to form a plasma generating arc therebetween from an electric source of power, and means for admitting pressurized water continuously into said parabolic cavity and to the annular space between said concentric electrodes.

2. An arc plasma propulsion system as defined in claim 1 characterized in the provision of means pivoting said electrode supporting means about said vertical axis thereby to change the direction of propulsion of said load supporting structure.

3. An arc plasma propulsion system as defined in claim 1 characterized in that said load supporting structure comprises a ship hull having a bow and a stern and wherein said propulsion unit includes journal means secured beneath the said stern and equipped to support said housing for pivotal movement about said generally vertical axis.

4. An arc plasma propulsion system as defined in claim 3 characterized in that said water admitting means extends upwardly into said hull coaxially of the pivotal support for said propulsion unit.

5. An arc plasma propulsion system as defined in claim 1 characterized in that said electrical power source comprises alternating power.

6. An arc plasma propulsion system as defined in claim 1 characterized in that said electrical power source comprises continuous direct current power source.

7. An arc plasma propulsion system as defined in claim 7 characterized in that said electrical power supply comprises a noncontinuous direct current power source.

* * * * *